(12) United States Patent
Neal

(10) Patent No.: US 10,426,136 B2
(45) Date of Patent: Oct. 1, 2019

(54) FEED APPARATUS AND SYSTEM

(71) Applicant: Calf Smart Limited, Dannevirke (NZ)

(72) Inventor: Ben Stanley Neal, Dannevirke (NZ)

(73) Assignee: Calf Smart Limited, Dannevirke (NZ)

( * ) Notice: Subject to any disclaimer, the term of this patent is extended or adjusted under 35 U.S.C. 154(b) by 216 days.

(21) Appl. No.: 15/501,048

(22) PCT Filed: Jul. 31, 2015

(86) PCT No.: PCT/NZ2015/050100
§ 371 (c)(1),
(2) Date: Feb. 1, 2017

(87) PCT Pub. No.: WO2016/018162
PCT Pub. Date: Feb. 4, 2016

(65) Prior Publication Data
US 2017/0223925 A1    Aug. 10, 2017

(30) Foreign Application Priority Data
Aug. 1, 2014    (NZ) .......................................... 628194

(51) Int. Cl.
*A01K 5/00*    (2006.01)
*A01K 5/02*    (2006.01)
*A01K 11/00*    (2006.01)

(52) U.S. Cl.
CPC .......... *A01K 5/0216* (2013.01); *A01K 5/0275* (2013.01); *A01K 11/006* (2013.01)

(58) Field of Classification Search
CPC ...... A01K 5/02; A01K 5/0216; A01K 5/0275; A01K 11/00; A01K 11/006
See application file for complete search history.

(56) References Cited

U.S. PATENT DOCUMENTS

| | | | | | |
|---|---|---|---|---|---|
| 3,303,824 | A | * | 2/1967 | Anderson | A01K 5/0216 119/72.5 |
| 4,653,432 | A | * | 3/1987 | Smeds | A01K 5/0216 119/71 |
| 5,355,833 | A | * | 10/1994 | Legrain | A01K 9/00 119/51.02 |
| 6,205,952 | B1 | * | 3/2001 | Forster | A01K 5/0216 119/71 |
| 6,443,093 | B1 | * | 9/2002 | van der Lely | A01K 9/00 119/14.01 |
| 7,481,181 | B2 | * | 1/2009 | Arnerup | A01K 7/022 119/71 |
| 2013/0199450 | A1 | * | 8/2013 | Harty, Sr. | A01K 5/0225 119/51.02 |

FOREIGN PATENT DOCUMENTS

DE    3316434    11/1984
DE    102004045569    3/2006
(Continued)

*Primary Examiner* — Monica L Williams
*Assistant Examiner* — Aaron M Rodziwicz
(74) *Attorney, Agent, or Firm* — GableGotwals

(57) ABSTRACT

This invention relates to a feed system for delivering liquid feed to animals. The system includes a feed apparatus having at least one liquid feed source, and at least one at least common supply line connected to the liquid feed source. A plurality of animal feeding stalls are connected to the at least one common supply line along its length.

12 Claims, 15 Drawing Sheets

(56) References Cited

FOREIGN PATENT DOCUMENTS

| | | |
|---|---|---|
| EP | 2025209 | 12/1971 |
| EP | 0163080 | 12/1985 |
| EP | 0296260 | 12/1988 |
| EP | 0441086 | 8/1991 |
| EP | 0765600 | 4/1997 |
| GB | 1071396 | 6/1967 |

* cited by examiner

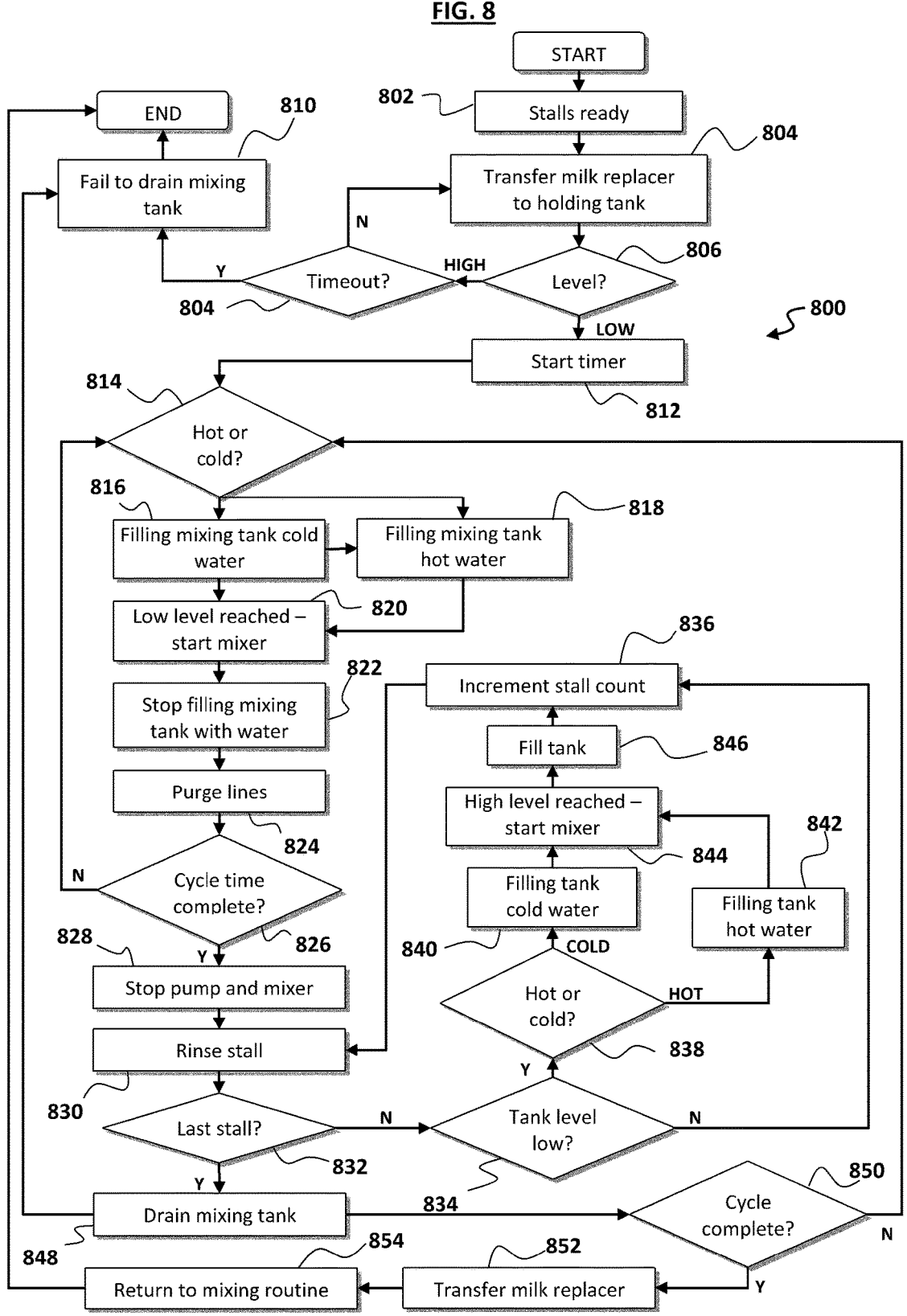

US 10,426,136 B2

FEED APPARATUS AND SYSTEM

CROSS-REFERENCE TO RELATED APPLICATIONS

This United States application is the National Phase of PCT Application No. PCT/NZ2015/050100 filed 31 Jul. 2015, which claims priority to New Zealand Patent Application Number 628194 filed 1 Aug. 2014, the entire contents of each are incorporated herein by reference.

TECHNICAL FIELD

The present application relates to a feed apparatus and system for delivering liquid feed to animals.

BACKGROUND

Automated feeding systems are well known for the supply of feed to animals—particularly liquids such as milk or a milk replacer to young animals.

The predominant design for such systems provides several animal feeding stalls, each individually connected to a central feed distribution unit. This central unit delivers feed to each stall—potentially according to a feed plan for an individual animal identified as being present in a stall.

This direct distribution of feed requires individual feed lines between the central unit and the stalls. In operations requiring the supply of feed to a number of stalls, capital costs associated with the quantity of lines and labour time in installation due to complexity can escalate rapidly. Further, this arrangement has a number of attributes which are less than ideal in a liquid feeding environment.

For example, individual lines have the potential for spoilage of the liquid feed due to due to long residence time should the demand for feed be minimal on a particular stall. As well as the costs associated with wastage, this also creates health risks should this spoiled feed be delivered to an animal.

With regard to health, poor sanitation of animal feeding equipment can result in the creation of sources of disease and increase the likelihood of infection being spread. Direct distribution systems to a number of stalls require complicated wash routines to maintain cleanliness of the system— reducing reliability due to the increased likelihood of bugs occurring.

Further, the feed line diameter is generally minimised in order to reduce the capital costs associated with a feed system. However, smaller diameter feed lines also have a greater susceptibility to blockages which can have implications for cleanliness as well as preventing feed being delivered to an animal.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to an exemplary embodiment, there is provided a feed apparatus for delivering liquid feed to animals, including:
   at least one liquid feed source,
   at least one common supply line connected to the liquid feed source, wherein the common supply line is configured to be connected to a plurality of animal feed stalls.

According to an exemplary embodiment, there is provided a feed system including:
   a feed apparatus substantially as described herein; and
   a plurality of animal feeding stalls connected to the at least one common supply line along its length.

According to an exemplary embodiment, there is provided a method of delivering liquid feed to a plurality of animal feeding stalls including:
   delivering liquid feed to a common supply line; and
   delivering the liquid feed to a plurality of animal feeding stalls connected to the common supply line along its length.

The liquid feed may be any liquid known to people skilled in the art for meeting nutritional requirements of an animal—particularly young animals such as bovine calves. For example, the liquid feed may be milk—whether whole or skim—or a milk replacer, known in the context of feeding calves as calf milk replacer (CMR).

The liquid feed source from which the liquid feed is supplied may, in exemplary embodiments, be a vessel in which the liquid fed is stored or mixed.

For example, at least one liquid feed source may be a milk tank storing whole milk—whether a stand-alone tank or fed from a bulk milk tank into which milk extracted from milking animals is delivered. Storing milk in a single location, as opposed to smaller volumes at each feeding stall, may assist in maintaining freshness of the milk by distributing it as required—thereby reducing the likelihood of it going unused before needing to be disposed. Reducing wastage of liquid feed may improve the cost efficiency of the system—not simply in terms of raw materials but also flow on considerations associated with disposal of the waste.

The volume of liquid feed at a liquid feed source may be monitored using any suitable level sensor known to a person skilled in the art. This information may be delivered to controllers of the system for operational decision making or output to a user.

The liquid feed source may include a mixer—for example a mixer paddle—in order to maintain freshness and uniformity of the liquid feed.

At least one liquid feed source may be, for example, a milk replacer system. In an exemplary embodiment the milk replacer system may include a mixing vessel. The mixing vessel may be one in which milk replacer is mixed manually, or automatically. As known in the art, automatic mixing of the milk replacer may include the dispensing of a measured ratio of powdered milk replacer and water into the vessel, and stirring the mixture according to specifications for the milk replacer for a predetermined period of time. A desired temperature during mixing may be achieved using a heating element, or by the mixing of hot and cold water.

In exemplary embodiments the milk replacer system may include a distribution vessel, which receives mixed milk replacer from the mixing vessel. A common supply line may be connected to the distribution vessel.

It is envisaged that the inclusion of a distribution vessel may have particular application in embodiments in which a large number of stalls are to be supplied. This may allow milk replacer to be supplied from the distribution vessel while a new or additional batch of milk replacer is being prepared in the mixing vessel. This may reduce queuing times where milk replacer is being demanded from a large number of stalls, as milk replacer should not be supplied from the mixing vessel during the mixing operation.

In exemplary embodiments, the milk replacer system may include a holding vessel into which milk replacer may be diverted—particularly while the mixing vessel and/or distribution vessel are washed. This may assist in reducing wastage while maintaining the ability to adhere to a cleaning schedule suitable for maintaining hygiene.

In exemplary embodiments, more than one liquid feed source may be connected to the feed stalls via respective common supply lines. For example, a first feed source may supply milk via a first common supply line, and a second feed source may supply CMR via a second supply line. The different types of liquid feed may be mixed in desired proportions at each stall, while retaining the benefits of storing the liquid feed in larger quantities and delivery of same via a common supply line.

Reference to a common supply line should be understood to mean a single fluid pathway, through which the liquid feed may travel to the plurality of animal feeding stalls via branching connections along its length. The points of connection between each feed stall and the common supply line may be displaced along the length of the common feed line.

It is envisaged that the addition of feed stalls to the system may be more readily accommodated by such common supply lines in comparison with the need to run a dedicated supply line between the stall and central distribution unit—if a further point of connection to the central distribution unit is even available.

The use of a common supply line may also assist in maintaining hygiene within the system, enabling the cleaning of a single fluid pathway with comparatively short branch lines to stalls, which may be less complex than cleaning of a plurality of dedicated supply lines—particularly if cleaning is to be performed under pressure. Further, in comparison with existing systems with individual supply lines the greater internal diameter of the common supply line may reduce the likelihood of blockages occurring.

It should be appreciated that the common supply lines may be sized on system pressure drop and flow volume requirement once a number of installation specific factors have been determined, such as the mechanism of delivery, viscosity of liquid feed, total length of the line, number of stalls on system, and quantity of pipe connections (i.e. elbows), deviations and elevation.

In an exemplary embodiment the common supply line is connected to its associated liquid feed source in a closed loop, for recirculation of unused liquid feed to the liquid feed source. This recirculation may be useful for maintaining freshness of the liquid feed—particularly where the feed is milk or a milk based feed which may require chilling in order to reduce the rate of spoilage.

In exemplary embodiments, in which the common supply line is connected to its associated liquid feed source in a closed loop, a supply line isolation valve may be positioned between the last animal feed stall along the common supply line and the liquid feed source. This valve may be closed when dispensing of the liquid feed from the common supply line to one or more stalls is desired. In doing so, the liquid feed may be forced to the stall(s) as opposed to being partially diverted to the source.

It should be appreciated that reference to the common supply line being connected to the liquid feed source in a closed loop is not intended to be limiting. For example, the common supply line may have a single point of connection to the feed source, such that a loop is not formed.

This may be applicable where, for example, liquid feed is of a type that can remain in the supply line for long periods of time without the need for recycling, i.e. has a low likelihood of spoiling or solidifying to cause blockages. In exemplary embodiments the demand at the end of the supply line may be such that throughput of the liquid feed negates the need to cycle. In other embodiments, the physical length of the common supply line may be of a length in which the benefits of recirculating the feed are outweighed by the demands of the line size and delivery mechanism due to the pressure drop associated with the return section to the liquid feed source.

In exemplary embodiments, a pump may be used to deliver feed to the common supply line from the feed source. However, it should be appreciated that other means for delivering the feed to the supply line may be used. For example, it is envisaged that the feed may be gravity fed from the feed source into the common supply line. Such gravity filling of the common supply line may be used where the feed source(s) can be positioned at a sufficient elevation to achieve the necessary head.

Delivery of liquid feed from the common supply line to an animal stall may be achieved, in an exemplary embodiment, using individual pumps at each stall. Where these pumps are only required to draw feed from the common supply line, it is envisaged that the specifications or ratings for the pumps may be reduced—with associated cost savings. However, it should be appreciated that such pumps may also be used to draw liquid feed from the feed source.

In exemplary embodiments, stall feed valves between the common supply line and the animal feed stall may be used to control delivery of feed from the common supply line to the stall. It is envisaged that valves may provide a lower cost alternative to pumps, although this may need to be weighed against their greater potential for blockage resulting from debris suspended in the liquid feed becoming caught on a valve's seat, and the possibility of valve seating failures leading to bypassing due to overpressure in the supply line.

Animal feed stalls are well known in the art, particularly for nursing animals in which liquid feed is ultimately delivered to the animal via an artificial nipple or teat.

In exemplary embodiments, the animal stall may identify an animal seeking to receive feed at the stall. Numerous techniques are known in the art for the identification of individual animals—for example using radio frequency identification (RFID) tags. Identification of an animal may be used to determine an individual feed ration for that animal. The individual feed ration may be determined on the basis of a number of factors, for example breed, genetic potential, sex, age, weight, time since previous feed, volume of previous feed ration consumed, or specified nutritional requirements.

The individual feed ration may be composed of a mixture of liquid feeds delivered by respective common supply lines. The ratio of this mixture may vary greatly between animals. Use of common supply lines to deliver the constituents of the mixture as required means that individual stalls need not store quantities of a liquid feed which may otherwise go unused for an undesirable length of time depending on the requirements of animals entering the stall.

Further, the ration may be diluted using water delivered to the stall. In exemplary embodiments the stall may include an additive delivery mechanism, operable to deliver additives—whether nutritional or medicinal—into the individual feed ration.

In exemplary embodiments the liquid feed to be delivered to the animal may be heated to a drinking temperature at the animal stall. It is well established that temperature of the feed at the time of consumption may impact feed efficiency. By heating the feed at the stall as opposed to the feed source, the feed may be kept at a suitable storage temperature at the source for reducing the rate of spoilage, while still achieving the desired drinking temperature.

It is envisaged that volume of liquid feed consumed by an animal may be achieved using a level sensor within a stall liquid feed vessel. It should be appreciated that alternative means, such as weight of the vessel or flow rate through a line to the point of delivery to the animal, may be used to determine volume of consumption. This may be logged against the animal's identification in order to create or add to a record of the animal's nutrition.

In exemplary embodiments, the feed ration may be dispensed in portions until the complete ration has been dispensed. In doing so it is envisaged that wastage may be reduced—if an animal leaves a stall or otherwise does not consume the available ration, only that portion need be disposed of.

The various illustrative logical blocks, modules, circuits, and algorithm steps described in connection with the embodiments disclosed herein may be implemented as electronic hardware, computer software, or combinations of both. In particular, they may be implemented or performed with a general purpose processor such as a microprocessor, or any other suitable means known in the art designed to perform the functions described.

The steps of a method or algorithm and functions described in connection with the embodiments disclosed herein may be embodied directly in hardware, in a software module executed by a processor, or in a combination of the two. If implemented in software, the functions may be stored as processor readable instructions or code on a tangible, non-transitory processor-readable medium—for example Random Access Memory (RAM), flash memory, Read Only Memory (ROM), hard disks, a removable disk such as a CD ROM, or any other suitable storage medium known to a person skilled in the art. A storage medium may be connected to the processor such that the processor can read information from, and write information to, the storage medium.

In particularly, it is envisaged that a main controller including one or more processors may be provided to control operation of the feed apparatus and various components thereof. Each animal feed stall may include a dedicated stall controller. The stall controllers may communicate with the main controller to coordinate certain functions—for example operation of a pump in the common supply line by the central controller, while a stall controller simultaneously opens a stall feed valve for delivery of feed to the stall.

BRIEF DESCRIPTION OF DRAWINGS

Further aspects of the present invention will become apparent from the following description which is given by way of example only and with reference to the accompanying drawings in which:

FIG. 8 is a flow diagram illustrating an exemplary method of washing an exemplary milk replacer apparatus;

DETAILED DESCRIPTION

Figure 1:
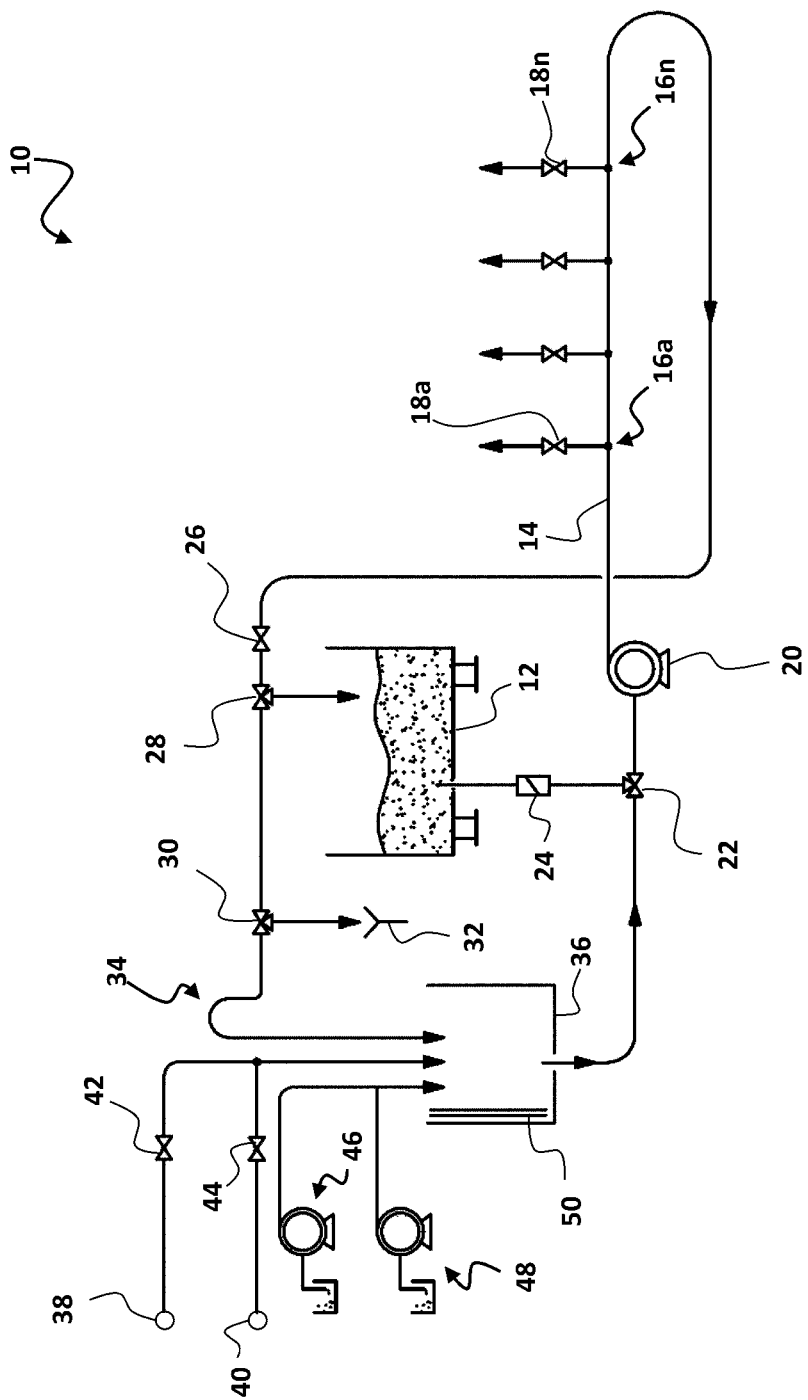
FIG. 1 is a schematic diagram illustrating an exemplary milk feed apparatus.

FIG. 1 illustrates a milk feed apparatus 10 for the supply of milk to animal feeding stalls. The apparatus 10 includes a liquid feed source in the form of a whole milk vat 12. The whole milk vat 12 may be, for example, a vat into which a milking operation's milk is delivered for storage—potentially for transportation to a processing facility in addition to acting as a feed source.

The apparatus 10 includes a milk common supply line 14 connected to the vat 12, providing a fluid pathway from the vat 12 to a plurality of animal feed stall branch lines 16a to 16n disposed along the common supply line 14. In this exemplary embodiment, milk feed valves 18a to 18n are positioned in the respective branch lines 16a to 16n—operation of which will be described in greater detail below.

Delivery of milk from the vat 12 through common supply line 14 is achieved using main supply pump 20 and cycle stop valve (CSV) 22. The main supply pump 20 may be, for example, a peristaltic pump or a centrifugal pump. It should be appreciated that the rating of main supply pump 20 will be dependent on the size of the system in which it is implemented.

A filter 24 is provided between the vat 12 and the CSV 22, to capture residual sediment in the milk and prevent its passage into the various valves of the system, and ultimately an animal to which the milk is fed.

The common supply line 14 is configured as a closed loop, feeding back into the vat 12 though isolation valve 26 (which may be removed in order to reduce the complexity and cost of the system) and return valve 28. Where it is desirable to feed unused milk back into the vat 12, the return valve 28 may be controlled to open the common supply line 14 to the vat 12. Otherwise, for disposal of the milk or washing fluid, a drain valve 30 is provided for opening the common supply line 14 to a drain 32.

An elevated section 34 of pipe leads from the drain valve 30 to a chemical wash tank 36, and is used to prevent free draining of wet leg back to the wash tank 36 on completion of a wash cycle or following purging of the liquid feed. A hot water inlet 38 and mains supply cold water inlet 40 feed into the wash tank 36 via hot water valve 42 and cold water valve 44 respectively. Acid detergent supply 46 and alkaline detergent supply 48 also feed into the wash tank 36. A wash level sensor 50 is used to determine fluid levels within the wash tank 36.

The CSV 22 may be, for example, a 3-port valve controllable to create either a path from vat 12 to pump 20, or from wash tank 36 to pump 20.

Figure 2A:
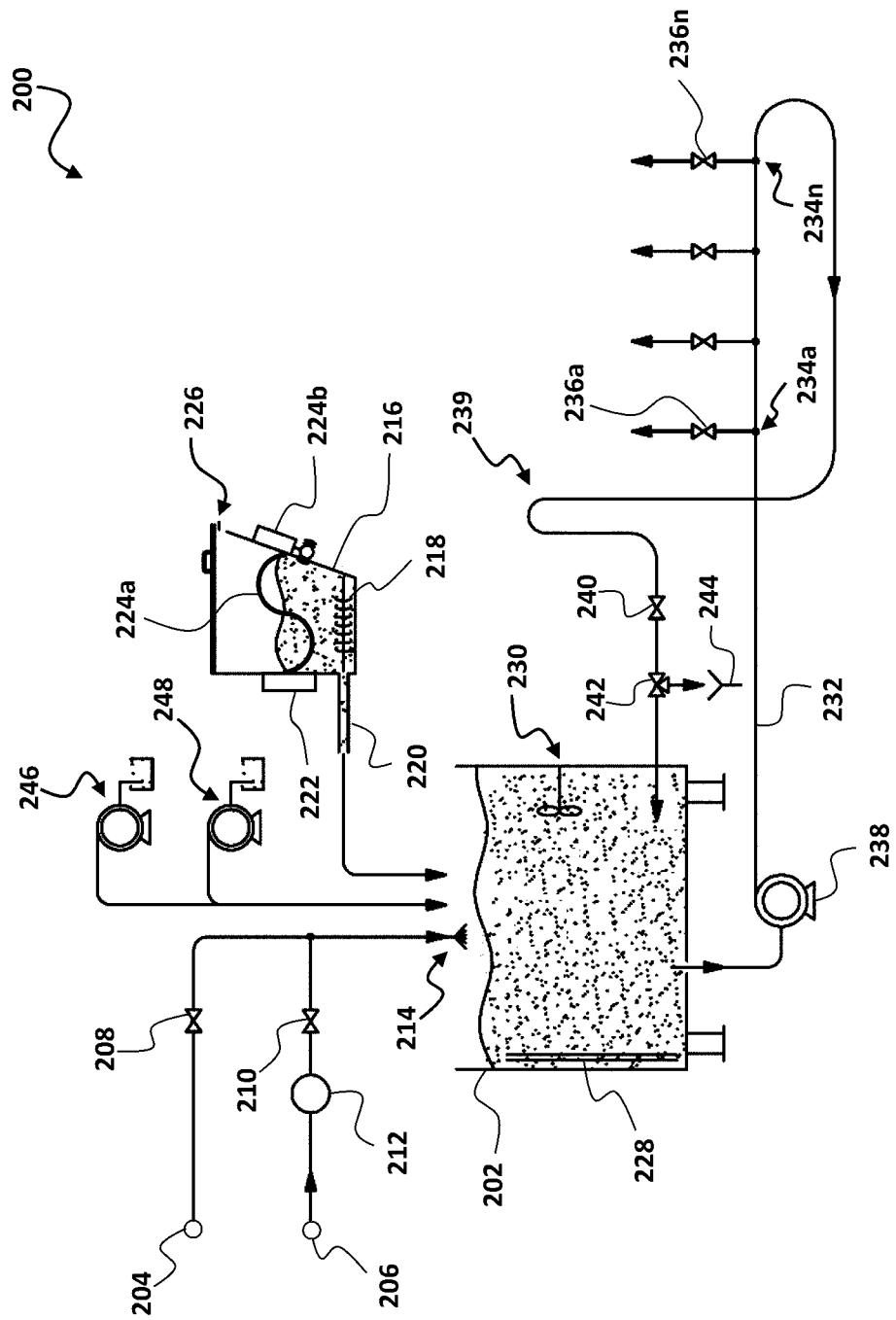
FIG. 2A is a schematic diagram illustrating a first exemplary milk replacer apparatus.

FIG. 2A illustrates an exemplary milk replacer apparatus 200 for the supply of milk replacer to animal feeding stalls. The apparatus 200 includes a liquid feed source in the form of a mixing tank 202.

A hot water inlet 204 and mains supply cold water inlet 206 feed into the mixing tank 202 via hot water valve 208 and cold water valve 210 respectively, with a pressure relief valve 212 also provided on the cold water line. It should be appreciated that while not illustrated a pressure relief valve may also be provided on the hot water inlet dependent on piping configuration. A spray nozzle 214 into the mixing tank 202 assists with cleaning of the mixing tank 202 in addition to supplying water for the purposes of mixing milk replacer.

A milk replacer hopper 216 stores powdered milk replacer, desired quantities of which are fed into the mixing tank 202 using auger 218. A powder sensor 220, for example a proximity sensor or paddlewheel flow sensor, is located at the outlet of the hopper 216 to confirm the output of product feed into the mixing tank 202. A hopper level sensor 222, for example a ultrasonic range sensor to measure distance to the surface of the powder or a load measuring device to determine weight, may also fitted to hopper to give indication of product remaining.

A fluidiser such as a mixing paddle 224a and/or a vibrator 224b is used to keep the powdered milk replacer fluid for ease of dispensing and to prevent 'powder bridging' of product inside the hopper 216.

Lid switch 226 may be used to electrically isolate the moving parts inside the hopper 216 upon opening of lid, for sensing purposes.

Mixing tank level sensor 228 is used to determine when a desired volume of water has been introduced to the mixing tank 202 (although this may also be controlled via valve 208 or 210 open time—regulated by pressure), while agitator 230 induces fluid flow within the tank 202 to mix the milk replacer. Level sensor 228 is also used to determine amount of milk replacer remaining in the tank 202, in order to identify when mixing of a new batch of milk replacer should be initiated.

The apparatus 200 includes a milk replacer common supply line 232 connected to the mixing tank 202, providing a fluid pathway from the tank 202 to a plurality of animal feed stall branch lines 234a to 234n disposed along the common supply line 232. In this exemplary embodiment, milk replacer feed valves 236a to 236n are positioned in the respective branch lines 234a to 234n—operation of which will be described in greater detail below. It should be appreciated that the delivery of milk replacer through animal feed stall branch lines 234a to 234n may be effected by way of pumps, as demonstrated by embodiments described further below.

Delivery of milk replacer from the mixing tank 202 through common supply line 232 is achieved using milk replacer supply pump 238. The common supply line 232 is configured as a closed loop, feeding back into the tank 202 though a high point 239 to prevent free draining back to the mixing tank 202 to reduce the likelihood of air locks being created in the system. Isolation valve 240 and milk replacer drain valve 242 are also provided to control flow through common supply line 232. Where it is desirable to feed unused milk replacer back into the tank 202, the isolation valve 240 and drain valve 242 may be controlled to open the common supply line 232 to the tank 202. Otherwise, for disposal of the milk replacer or washing fluid, the drain valve 242 is provided for opening the common supply line 232 to a drain 244.

For cleaning purposes, acid detergent supply 246 and alkaline detergent supply 248 also feed into the mixing tank 202.

Figure 2B:
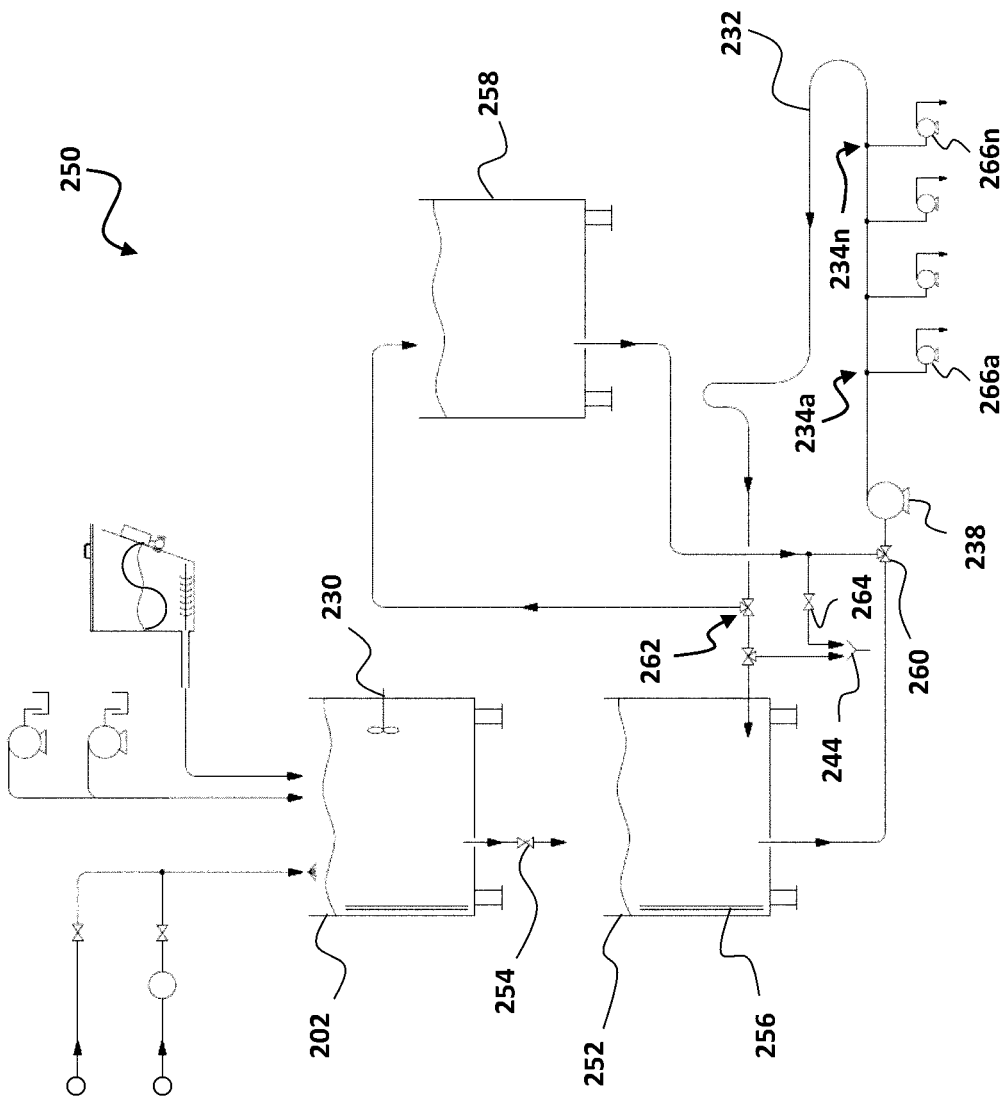
FIG. 2B is a schematic diagram illustrating a second exemplary milk replacer apparatus.

FIG. 2B illustrates another exemplary milk replacer apparatus 250—generally configured in the manner of milk replacer apparatus 200. Milk replacer apparatus 250 includes a distribution tank 252 into which mixed milk replacer may be delivered and stored from mixing tank 202 via valve 254. This enables new batches of milk replacer to be mixed in the mixing tank 202, while still allowing the distribution of milk replacer to common supply line 232. The volume of milk replacer in the distribution tank may be measured using level sensor 256, and used in decision making relating to the mixing of additional batches.

The milk replacer apparatus 250 also includes holding tank 258, connected to common supply line 232 on either side of the branch lines 234a to 234n via respective diverter valves 260 and 262. Where cleaning in place of the mixing tank 202, distribution tank 252 and common supply line 232 is desired, residual milk replacer may be pumped into the holding tank 258 and then isolated until the wash cycle has completed. A holding tank drain valve 264 may be operated to divert the contents of the holding tank 258 to the drain 244.

In milk replacer apparatus 250, each branch line 234a to 234n is provided with a stall pump 264a to 264n respectively. In embodiments, these pumps 266a to 266n may be used in place of main pump 238 to draw milk replacer to the branch lines 234a to 234n. It should also be appreciated that the delivery of milk replacer through animal feed stall branch lines 234a to 234n may be effected by way of valves, as demonstrated by embodiments described herein.

Figure 3A:
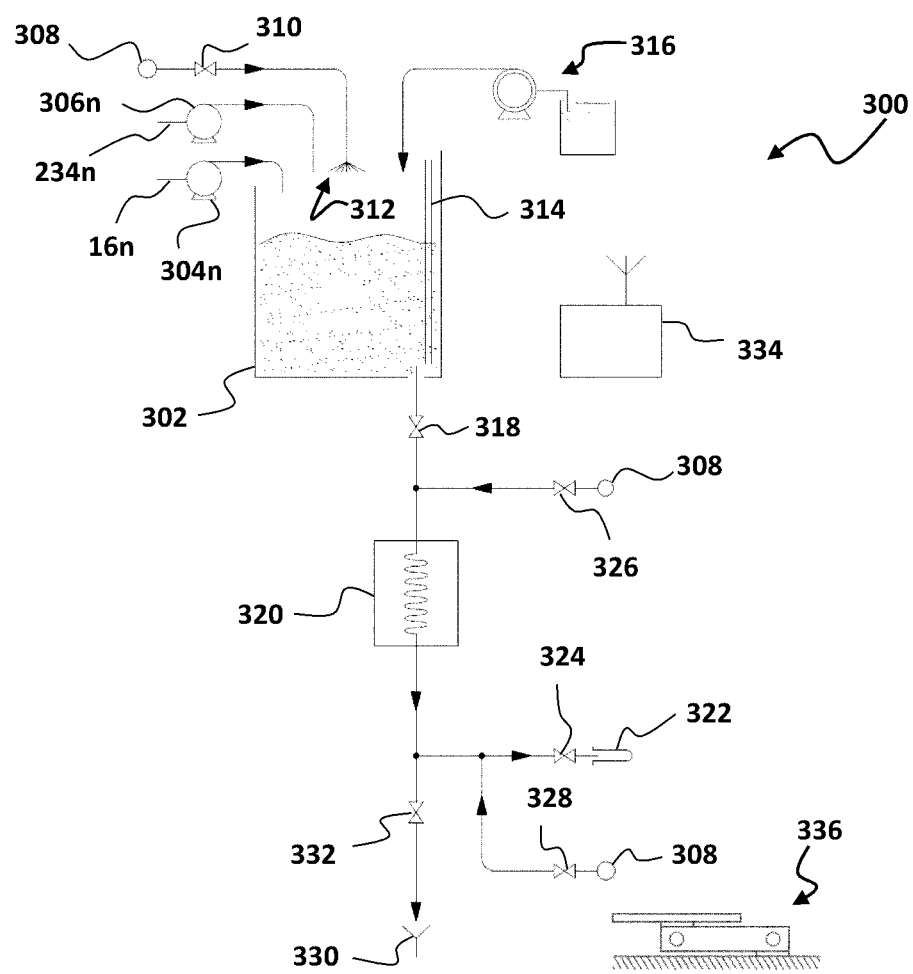
FIG. 3A is a schematic diagram illustrating an exemplary animal feeding stall.

FIG. 3A illustrates an animal feeding stall 300 for feeding an animal a liquid feed. The stall 300 includes a feed tank 302 into which milk and milk replacer may be fed via branch lines 16n and 232n illustrated in FIG. 1, and FIG. 2A and FIG. 2B, respectively. In this exemplary embodiment, the stall 300 is provided with a milk pump 304n and a milk replacer pump 306n for drawing milk and milk replacer respectively from common lines 14 and 230.

Cold water is also fed into the feed tank 302 from cold water inlet 308 through stall cold water valve 310, and out of stall spray nozzle 312. The volume of feed within the feed tank 302 may be determined using feed tank level sensor 314; alternatively the milk and milk replacer will be metered in via pump of valve operating time. Additives are also introduced using additive delivery mechanism 316.

Liquid feed is delivered from the feed tank 302 using feed tank valve 318, whereon it is heated using, for example, oil or water bath heat exchanger 320 to a suitable temperature for consumption. Subsequent delivery to a drinking teat 322 is controlled by teat valve 324.

First and second rinsing valves 326 and 328 are connected to the cold water inlet 308, and in conjunction with stall cold water valve 310 enable rinsing of the feeding stall 300. Rinsed water and/or waste liquid feed from the feed tank 302 may be delivered to stall drain 330 by stall drain valve 332.

The stall 300 includes a radio frequency identification unit 334 for identification of an animal presenting itself to feed from the stall 300, with load cell 336 recording weight of the animal.

Figure 3B:
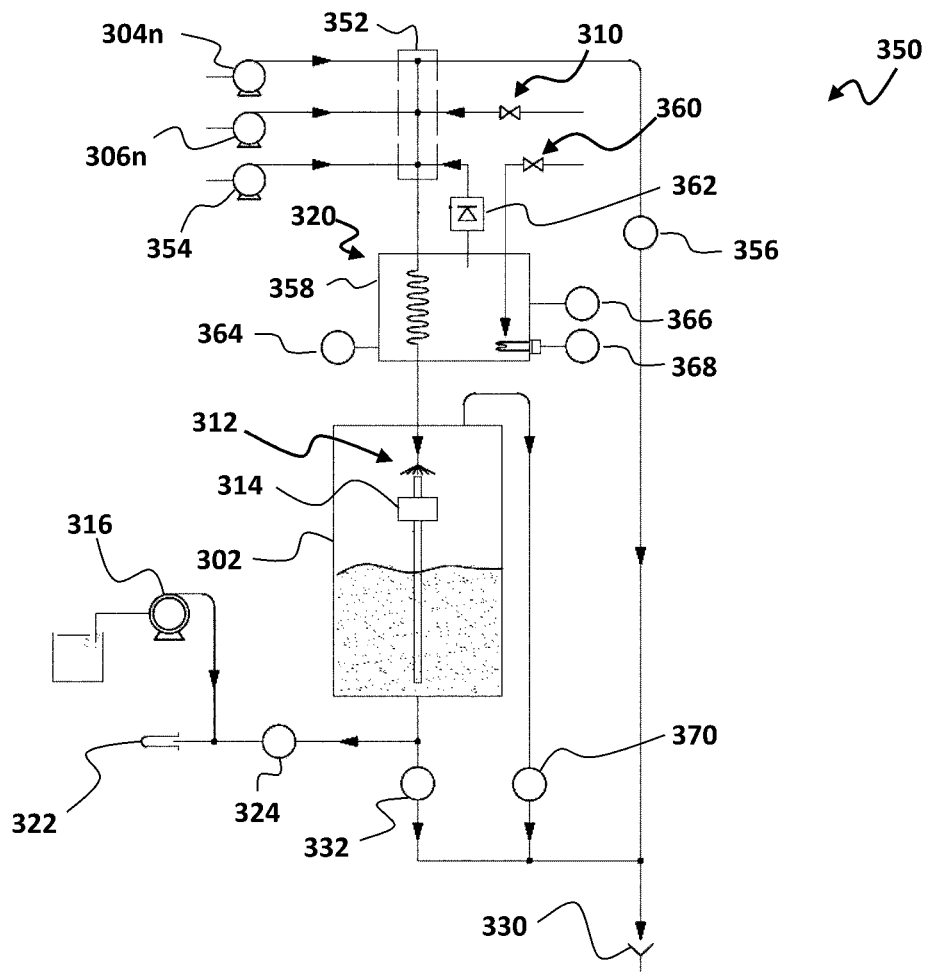
FIG. 3B is a schematic diagram illustrating an exemplary animal feeding stall.

FIG. 3B illustrates another exemplary animal feeding stall 350 for feeding an animal a liquid feed. A number of the components are effectively the same as stall 300, and corresponding labels will be used in the description of stall 350. The stall 350 includes a manifold 352 through which milk and milk replacer are fed using pumps 304n and 306n respectively. A supplement pump 354 also feeds supplement into the manifold 352—for example another type of liquid feed such as colostrum, or another type of milk or milk replacer, or any other known supplements such as vitamins or electrolytes.

Cold water is also fed through the manifold 352 using cold water valve 310, and a first vent 356 provides a controllable connection between the manifold 352 and a stall drain 330.

An outlet of the manifold 352 feeds through heat exchanger 320. A reservoir 358 of the heat exchanger 320 receives cold water through hot water valve 360, and is in turn connected to manifold 352 through a non-return valve 362. A reservoir level sensor 364 is provided, as are a temperature sensor 366 and heating element 368. Water heated in the reservoir 358 (for example to substantially 60° C.) may be displaced through the non-return valve 362 to the manifold 352 as required.

Liquid passing through the heat exchanger 320 is then delivered to feed tank 302 via stall spray nozzle 312. The volume of feed within the feed tank 302 may be determined using feed tank level sensor 314. A second vent 370 is provided between the feed tank 302 and the drain 330, as is drain valve 332.

Subsequent delivery of liquid feed from the feed tank 302 to a drinking teat 322 is controlled by teat valve 324. Additives are also introduced using additive delivery mechanism 316 (for example, a pump connected to an additive reservoir).

Figure 4:
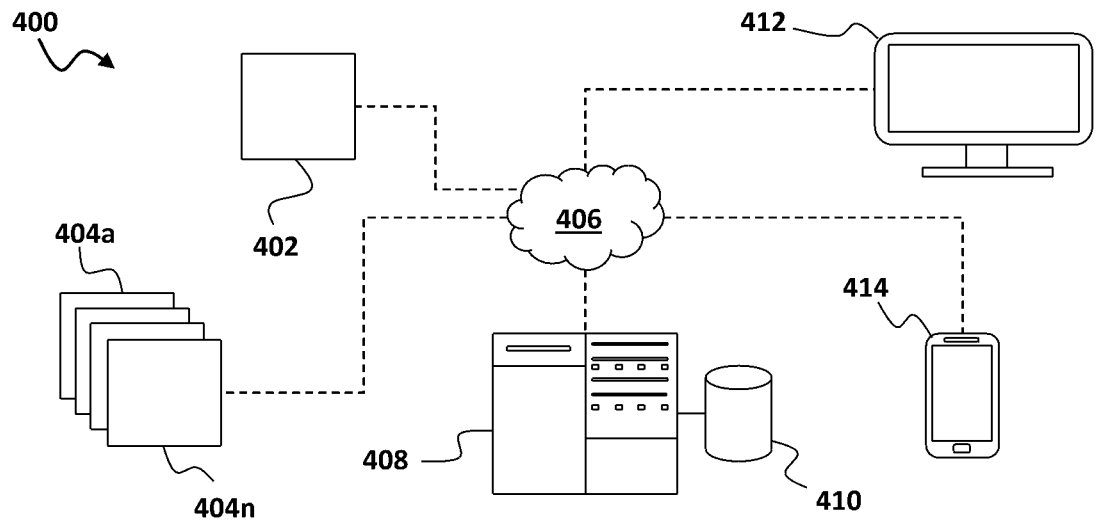
FIG. 4 is a schematic diagram illustrating an exemplary control system.

FIG. 4 illustrates an exemplary control system 400 for use with the milk feed apparatus 10, milk replacer feed apparatus 200 or 250, and animal feeding stall 300 or 350. It should be appreciated that the wider system may include any desired combination of such units (including multiple numbers thereof).

The control system 400 includes a main controller 402 configured to control operation of the milk feed apparatus 10 and milk replacer feed apparatus 200/250. The system 400 also includes a plurality of stall controllers 404a-n, configured to control operation of each respective stall—for example stall 300/350.

The main controller 402 and each stall controller 404a-n includes at least one processor and memory having stored therein instructions which, when executed by the processor(s), causes the processor(s) to perform the various operations of the controller.

The main controller 402 and stall controllers 404a-n are connected over a communications network 406—whether that be, for example, a communications bus (e.g., a CAN bus), a local area network, the internet, or any other suitable communication technology. While network 406 is illustrated as a single component, it should be appreciated that it may be composed of a number of sub-networks, potentially operating using distinct technologies—e.g. wired or wireless, fibre optic or radio.

Information may be retrieved from or stored to a central location, for example from a server 408 having storage unit 410. Such information may include, for example, details of an animal associated with a unique identification, a customised feed recipe for that animal, current details of the animal such as weight, and factors such as time of accessing the feed stall and/or quantity of feed consumed and feed habits. It should be appreciated that this functionality may be performed by a local work station 412. Further, such information may be accessed by the workstation 412 or a mobile user device 414 in order to monitor operations of the system.

It should also be appreciated that an individual stall controller, for example stall controller 404n, may also be configured to store all animal information related to that stall—effectively operating as an independent unit if required.

Figure 5A:
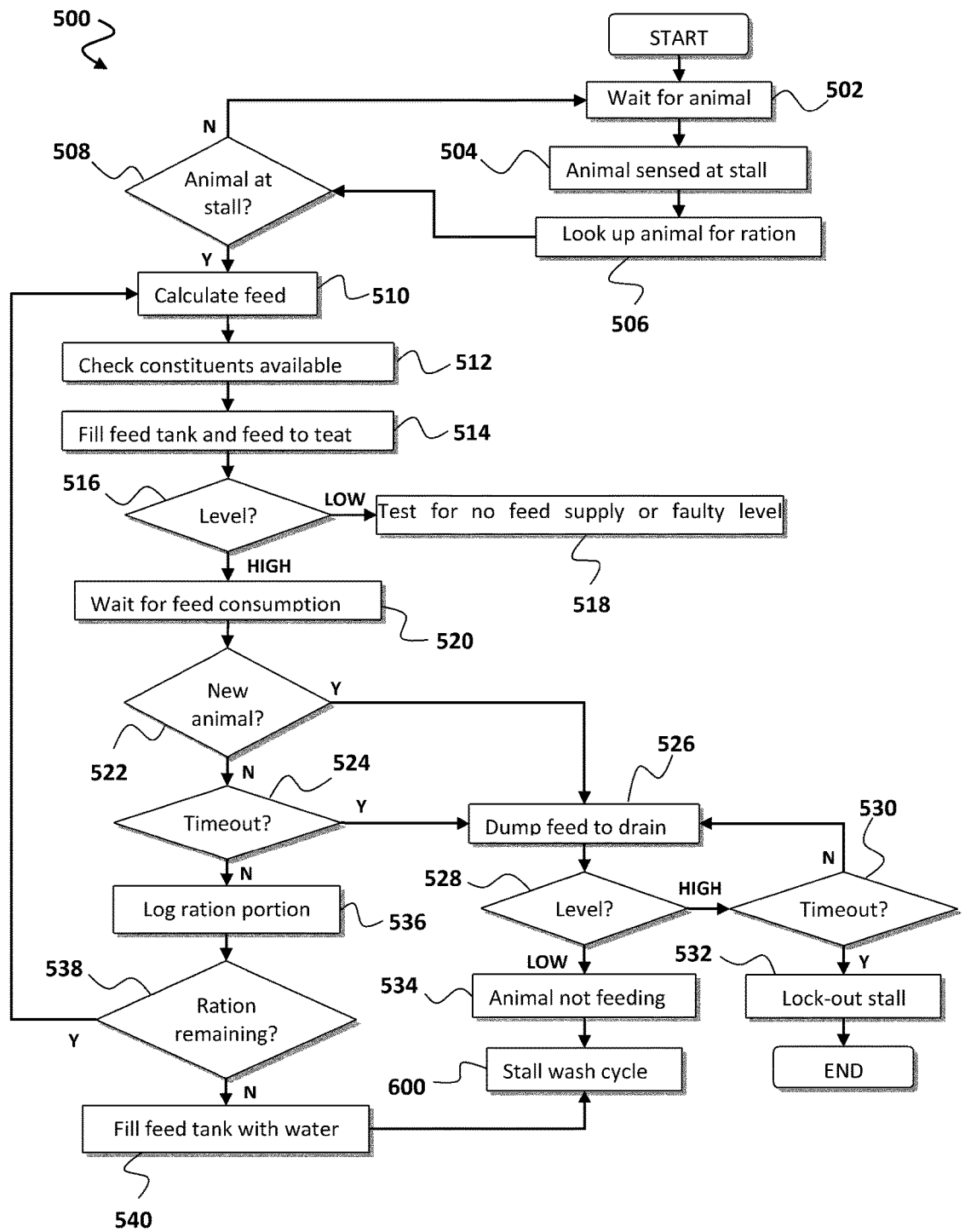
FIG. 5A is a flow diagram illustrating an exemplary method of operating an exemplary liquid feed system.

FIG. 5A illustrates an exemplary method 500 of operating a feed system including the milk feed apparatus 10, milk replacer feed apparatus 250, animal feeding stall 300 and control system 400. It should be appreciated that while the method 500 is described with reference to milk replacer feed apparatus 250 and feeding stall 300, a number of the steps will still apply to milk replacer apparatus 200 and animal feeding stall 350.

The method includes, at step 502, awaiting animal presenting itself to the stall 300, and identifying that animal using radio frequency identification (RFID) unit 334 in step 504. In step 506 the stall controller 404n requests, and is supplied with, individual feed ration data from the main controller 402 or the server 408 for the identified animal—particularly whether the animal is permitted any further ration at this point in time.

In step 508 the stall controller 404n determines whether the animal remains in the stall 300, and if so determines the required mix of constituents forming the basis of the animal's ration in step 510—for example the volume of milk, milk replacer, water, and additives.

In step 512 the stall controller 404n checks that milk and milk replacer are available from the vat 12 and distribution tank 252 respectively. Where they are, stall pumps 304n and 306n are operated for a set period of time to fill feed tank 302 with the desired quantities of milk and milk replacer in step 514. Similarly, stall cold water valve 310 and additive delivery mechanism 316 are controlled to add those ingredients to the feed tank 302.

In step 516, feed tank level sensor 314 is used to determine whether the feed tank 302 has been filled with the desired ration. If the level remains low, a subroutine testing for no feed supply or a faulty level sensor is run in step 518. If the level is that expected, in step 520 the stall controller 404n awaits consumption of the ration.

If a new animal is detected as entering the stall in step 522, or feeding time is determined to exceed a predetermined period (for example, 30 minutes) in step 524, the remaining feed is dumped to drain 330 in step 526.

In step 528, the level of the feed tank 302 is monitored. If the level remains high, the time elapsed since step 526 was initiated is monitored in step 530. If this exceeds a predetermined period (for example, two minutes), it is assumed that the level 314 is malfunctioning, and the stall is locked out of operation in step 532.

If the level trips low in step 528, it is determined in step 534 that the animal is not feeding. This is logged before the system is sent to a stall wash cycle in step 600.

Where the level trips low before timing out, the ration portion as logged as having been consumed by the animal in step 536. If an additional ration portion is determined to be available, the process returns to step 510. Otherwise, the feed tank 302 is filled with water in step 540 and the animal permitted access to the water until the tank 302 level trips low, or a predetermined time is reached. At this point, feed tank valve 318 and teat valve 324 are closed, and the system enters stall wash cycle 600.

Figure 5B:
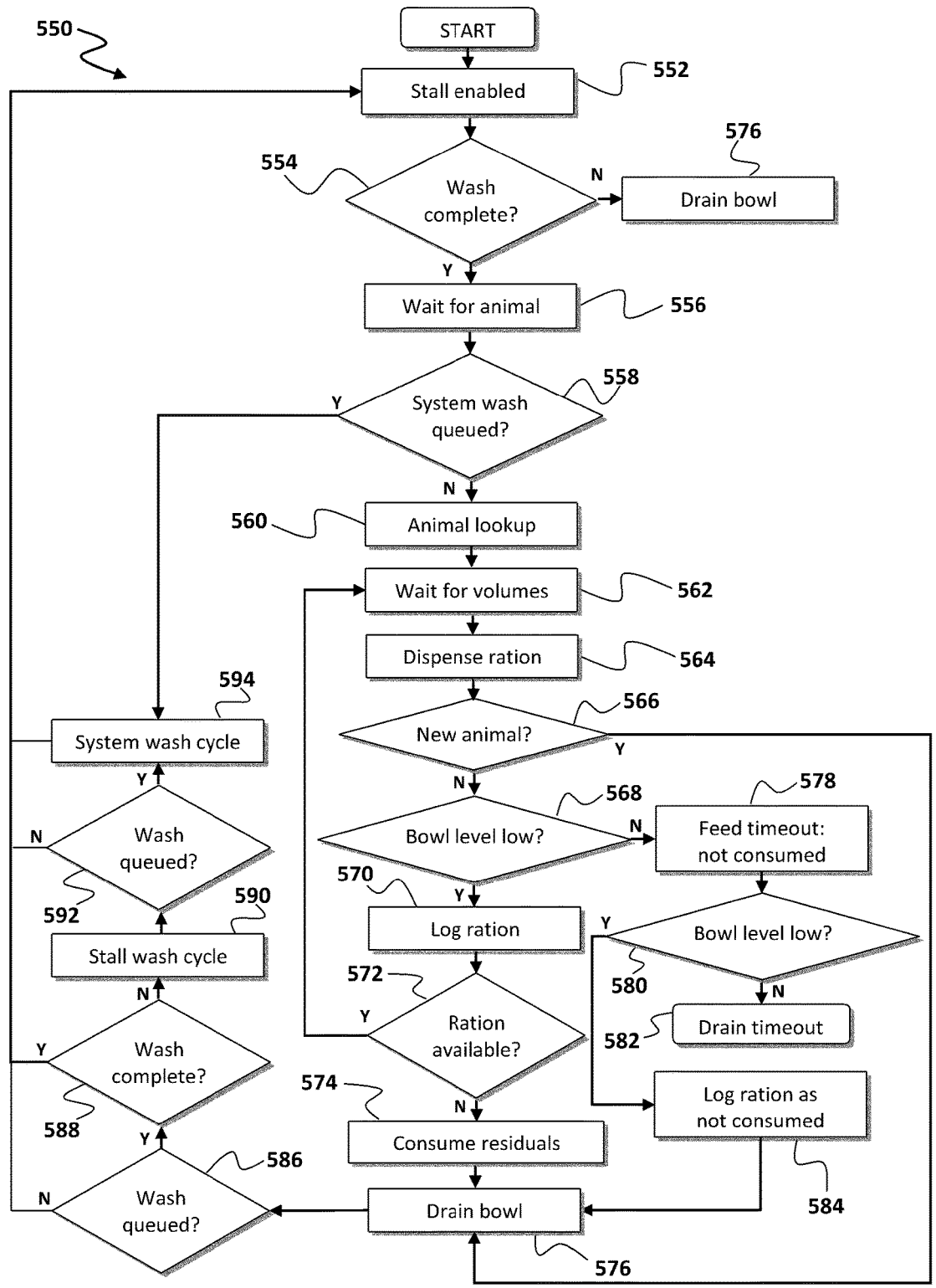
FIG. 5B is a flow diagram illustrating an exemplary method of operating an exemplary liquid feed system.

FIG. 5B illustrates another exemplary method 550 of operating animal feeding stall 350. In step 552, the stall is enabled for feeding an animal. In step 554 the system checks if a stall wash cycle has been completed—and if not continues to drain the feed bowl of the stall in step 576 (discussed below).

If the stall wash cycle is complete, in step 556 the system waits for an animal to be identified. The system checks at step 558 whether a system wash cycle is queued, and if so enters into the system wash cycle in step 594 (the system wash cycle may be, for example, that described with reference to FIG. 8 or FIG. 9A below). Otherwise, on detection of an animal the system looks up an animal profile in step 560 in order to establish a feed recipe for the ration of that animal. In step 562 the stall waits for the volumes of the liquid feed ingredients, before dispensing the ration in step 564.

If a new animal presents itself in step 566, the stall proceeds to drain the feed bowl of the stall in step 576 (discussed below). If not, the feed bowl level is monitored in step 568. If a predetermined lower threshold is reached, the ration is logged as being consumed in step 570, before checking for any further ration for that animal being available for consumption in step 572. If available, the system returns to step 562—otherwise, it provides time in step 574 for the animal to consume any residual ration and rinse water before draining the bowl in step 576.

If the bowl level does not decrease in step 568 within a predetermined period of time, a feed timeout is registered and a drain opened. If the bowl level does not decrease in step 580, a drain timeout error is registered in step 582. Otherwise, the ration is logged as going unconsumed in step 584 before draining of the bowl in step 576.

On draining, if a wash is registered as being queued in step 586, and a wash has not been completed in step 588, the stall enters a stall washing cycle 590. The stall washing cycle may include, for example, one or more of: a rinse, alkali wash, acid wash, and/or flush wash. Otherwise, the system returns to step 552. In step 592, if a wash is no longer queued, the system returns to step 552—otherwise it proceeds to a system wash cycle in step 594.

Figure 6:
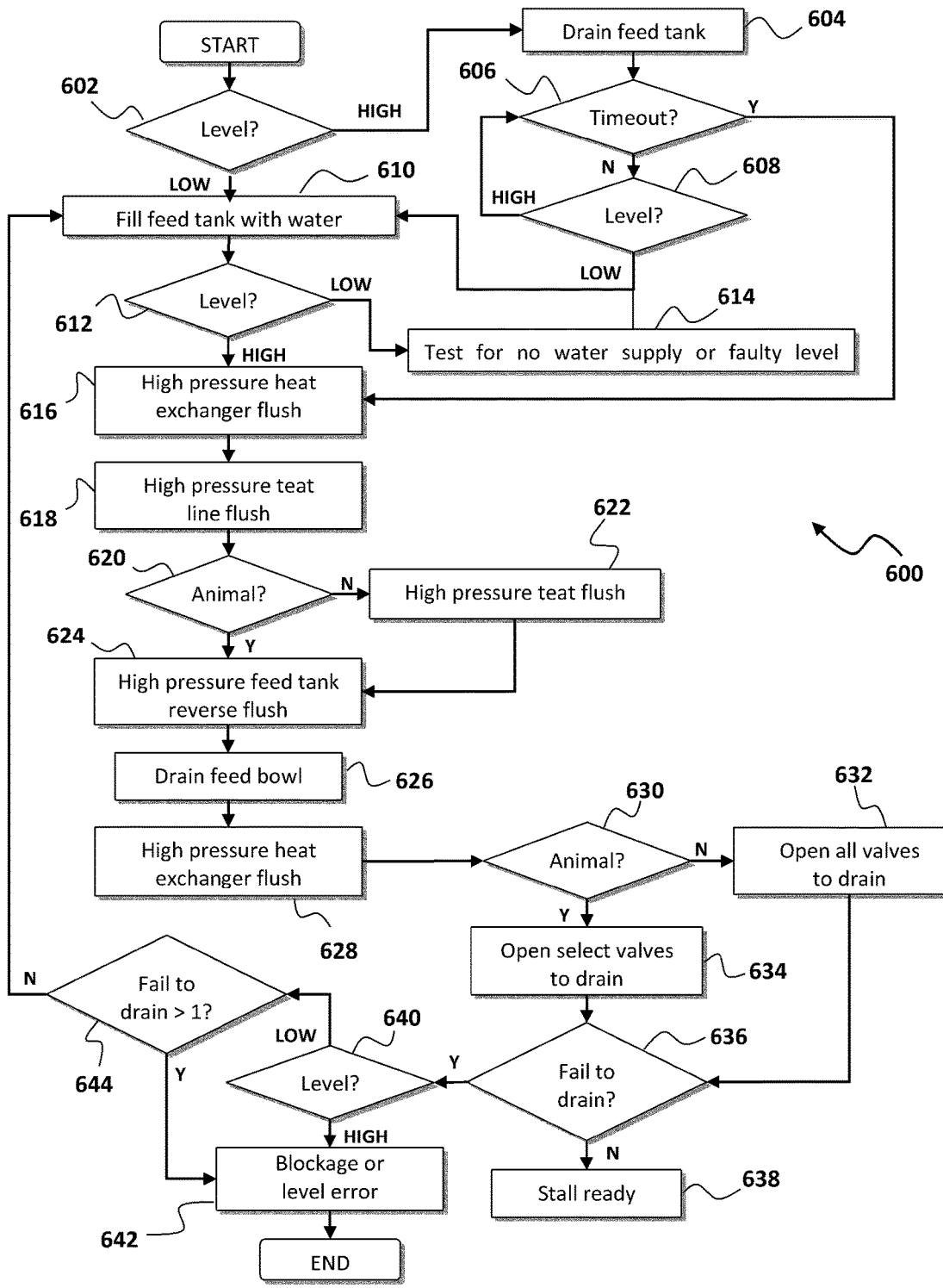
FIG. 6 is a flow diagram illustrating an exemplary method of performing a stall wash cycle.

FIG. 6 illustrates a method 600 of performing a stall wash cycle. In step 602, the level of feed tank 302 is checked. If the level is high, the feed tank 302 is drained by opening feed tank valve 318 and drain valve 332 in step 604. A timer is initiated in step 606, if the level trips in step 608 low before the time expires, the feed tank 302 is filled with cold water in step 610.

The level of the feed tank 302 is monitored—if it remains low for a predetermined period of time, a test for availability of the water supply or a fault in the level sensor 314 is initiated in step 614.

Otherwise, once the level sensor 314 indicates that the fill is complete, a high pressure flush of the coil of heat exchanger 320 is performed in step 616 by opening the first rinsing valve 326 for a predetermined period of time (for example, five seconds), and opening drain valve 332. This flush 616 may also be performed in the event that the timer in step 606 times out.

Following step 616, second rinsing valve 328 is opened for a predetermined period of time (for example, five seconds) to flush out the line leading to teat 322 in step 618.

In step 620, the RFID unit 334 is used to determine whether an animal is present in the stall 300. If not, drain valve 332 is closed, and teat valve 324 and second rinsing valve 328 are opened to flush out the teat 322 in step 622. If an animal is detected as being in the stall 300 in step 620, step 622 is bypassed and step 624 performed—in which first rinsing valve 326 and feed tank valve 318 are opened, and drain valve 332 closed, to conduct a reverse flush of the outlet from the feed tank 302.

In step 626 the feed tank 302 is opened to the drain 330, followed by a second flush of the heat exchanger 320 in step 628.

In step 630 the stall 300 is checked for the presence of an animal, and if no animal is present feed tank valve 318, teat valve 324, and drain valve 332 are all opened in step 632. If an animal is present, feed tank valve 318 and drain valve 332 are opened in step 634, while teat valve 324 is not.

If the feed tank 302 has not failed to drain in step 636, the stall is designated as ready to dispense liquid feed (for example by operating method 500). In the event the feed tank 302 has failed to drain, the level is monitored in step 640, and if high logs an error in step 642 indicating that a blockage has occurred, or the level sensor 314 is malfunctioning.

If the level is low, the stall controller 404n determines whether a failure to drain has previously been recorded in step 644. If it has, the method proceeds to step 642. If not, the system is returned to step 610 for another cycle.

Figure 7A:
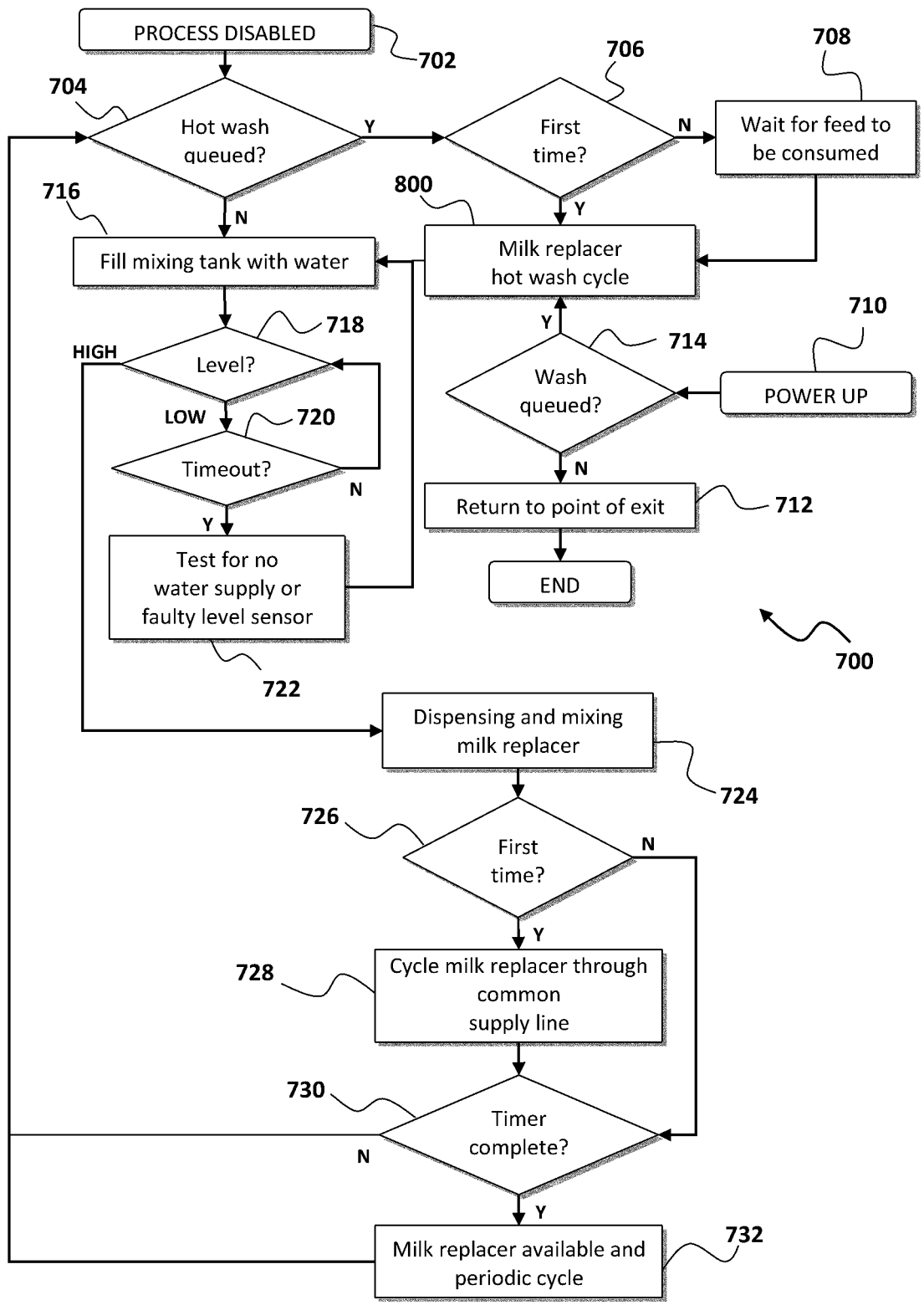
FIG. 7A is a flow diagram illustrating an exemplary method for mixing and dispensing milk replacer.

FIG. 7A illustrates a method 700 for mixing and dispensing milk replacer using milk replacer apparatus 250 of FIG. 2B. If a process associated with the milk replacer apparatus 250 has previously been disabled, method 700 is initiated in step 702. If a hot wash for the apparatus 250 is determined to have been queued in step 704, in step 706 it is determined whether this is the first time a hot wash has been queued—i.e. before dispensing of milk replacer. If not, in step 708 a timer is initiated to allow for remaining milk replacer to be consumed before progressing to a wash cycle 800 of the milk replacer apparatus 250—which will be described below in relation to FIG. 8. If this is the first hot wash, step 708 is bypassed.

After completion of the wash cycle 800, or if a hot wash is not queued in step 704, filling of the mixing tank 202 with cold water is initiated in step 716. The level is monitored in step 718, and if filling times out in step 720 a test is conducted to check for availability of water supply or malfunction of the level sensor in step 722.

Where the mixing tank 202 is filled to the desired level, in step 724 milk replacer powder is dispensed to the mixing tank 202 and mixed for the appropriate length of time, and then released to distribution tank 252.

In step 726 it is determined whether this is the first time the present batch of milk replacer has been cycled through the common supply line 232. If so, milk replacer is cycled through the common supply line 230 using pump 238, and an accumulative timer for the milk replacer is initiated in step 728.

If the accumulative timer has not been completed in step 730, the process returns to step 704 when the level of milk replacer in the distribution tank 252 is low. If it is determined in step 726 that this is not the first time the present batch of milk replacer has been cycled through the common supply line 232, step 728 is bypassed.

Once the accumulative timer has completed, the pump 238 is run on a duty cycle, making milk replacer available on the common supply line 232 in step 732.

Figure 7B:
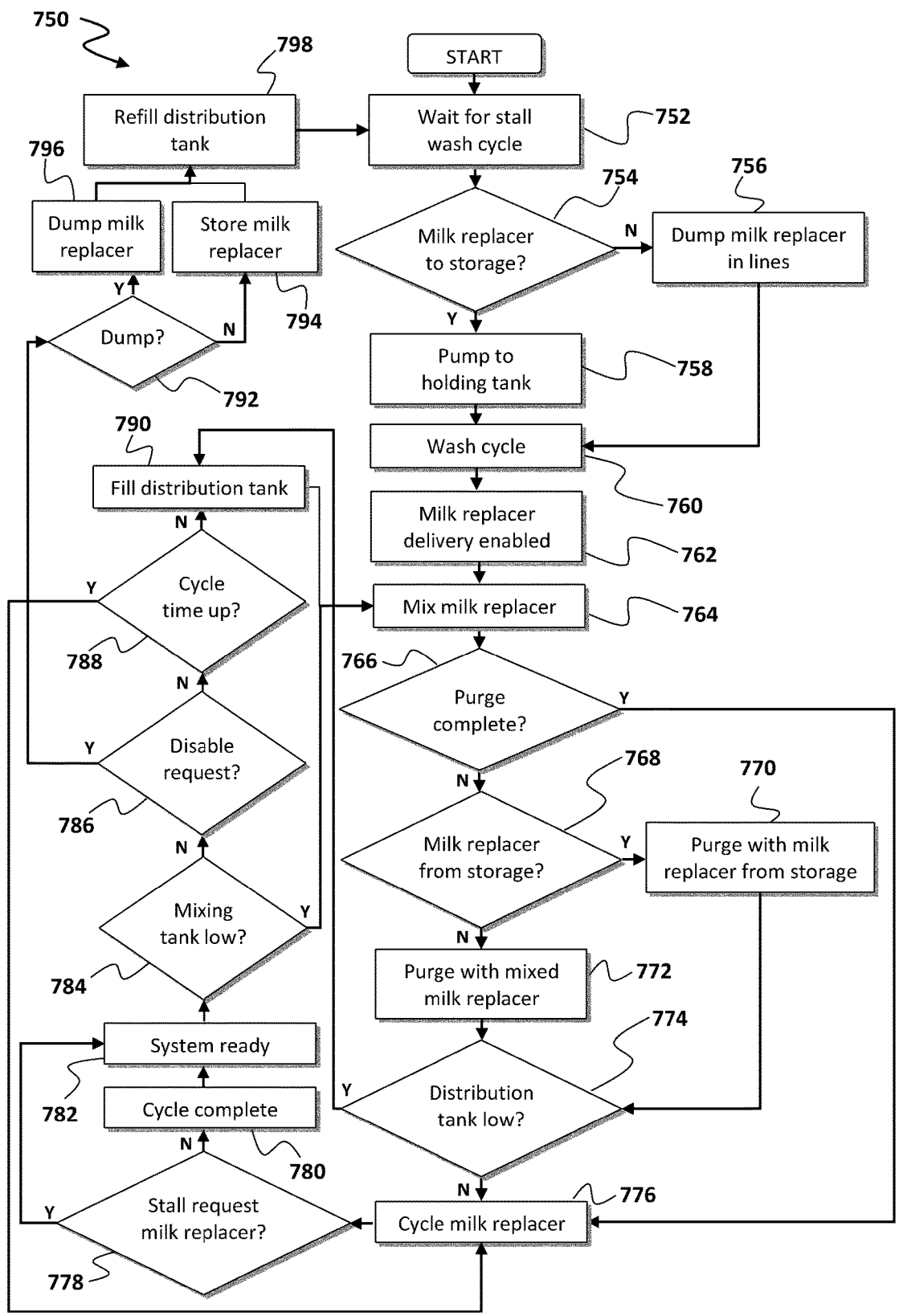
FIG. 7B is a flow diagram illustrating an exemplary method for mixing and dispensing milk replacer.

FIG. 7B illustrates a method 750 of controlling operation of milk replacer apparatus 250. In step 752 the system waits for the stalls (for example stall 300 or stall 350) to go to a wash cycle. On determining that all stalls are in a wash cycle, in step 754 a determination is made as to whether the milk replacer in the lines should be returned to the holding tank 258. If not, in step 756 the milk replacer in the lines is dumped to the drain. If so, the whole milk is pumped to the holding tank 258 in step 758.

In step 760 a wash cycle is carried out, which may include one or more of: a cold water rinse, a hot water rinse, an alkali wash, and/or an acid wash. Once the wash cycle is completed, the system waits to enable further operation of the milk replacer apparatus 250 in step 762 (which may be manual or automated).

In step 764, water and particulate milk replacer are fed into the mixing tank 202, and mixed to produce a new batch of milk replacer. In step 766, the system checks if a milk replacer purge has been performed. If not, the system checks if milk replacer is available from the holding tank 258 in step 768—if it is, the delivery lines are purged with milk replacer from the holding tank 258 in step 770, if not, a purge is performed with milk replacer from the mixing tank 202 in step 772.

In step 774, the level of distribution tank 252 is checked, and if not below a predetermined level and the milk replacer purge is complete, milk replacer is cycled in step 776. Referring back to step 766, if a purge has been performed the system enters the cycling step 776 directly.

The system awaits a request for milk replacer from a stall in step 778. If no such request is made, in step 780 a determination may be made that the milk replacer cycle is complete, before entering a system ready status in step 782. If a stall request is made, step 780 may be bypassed.

In step 784, if the level of mixing tank 202 is too low, the system returns to step 764. Otherwise, in step 786, if a milk replacer disable request has not been made, the system checks that the milk replacer has been cycled for a predetermined time in step 788. If the time has lapsed, the system returns to step 776—if not, the level of the distribution tank 252 is checked and filled if below a predetermined level in step 790, before the system returns to step 764.

Referring back to step 786, if a request to disable distribution of the milk replacer is received, a decision is made in step 792 whether to pump the milk replacer to storage in step 794, or dump it to waste in step 796. Once the level of the distribution tank reaches a predetermined low level, it is refilled in step 798, before returning to step 752.

FIG. 8 illustrates a method 800 of washing milk replacer apparatus 250. In step 802 it is determined that stalls (for example stall 300) is ready for a cold water wash cycle. In step 804 milk replacer is transferred to holding tank 258 by opening diverter valve 262 and operating pump 238.

In step 806 the level of the distribution tank 252 is monitored, and if the level remains high while timing out in step 808, a flag is set in step 810 indicating that a tank has failed to drain before an error message is logged and sent regarding malfunction of the pump 238 or a level sensor.

If the level of the distribution tank 252 is determined to be low in step 806, a timer is initiated in step 812 to allow time for the common supply line 232 to be emptied. On completion of the timer, in step 814 it is determined whether a hot or cold wash cycle is to be performed.

In step 816 or step 818, the mixing tank 202 is filled with cold or hot water respectively, with detergent being added in step 818. In step 820, when a low level of water is reached the agitator 230 is started. When a high level is reached in step 822, filling of the mixing tank is stopped, and valve 254 opened to drain mixing tank 202. Once the mixing tank level reaches a low point, the lines are purged in step 824 by operating pump 238 for a predetermined period of time. In step 826, if it is determined that a predetermined period of time for the current cycle has not completed, the process returns to step 814. If the time has lapsed, the agitator 230 and pump 238 are stopped in step 828.

In step 830 the stalls are rinsed, for example using method 600. In step 832 it is determined if all stalls have been washed based on a stall count bit set in software. If not, in step 834 it is determined if the distribution tank level is high—if so the stall count is incremented in step 836 and the process returns to step 830. If the distribution tank level is low, in step 838 it is determined whether a cold or hot wash is to be performed, and in steps 840 and 842 the mixing tank 202 is filled with cold or hot water respectively, with detergent being added in step 842. Once the mixing tank 202 level reaches a high level, filling is stopped and agitator 230 is operated for a predetermined period of time (for example five seconds). In step 846 the valve 254 is opened, and mixing tank 202 drained into distribution tank 252 before the stall count is incremented in step 836.

Once the last stall is determined as having been through the cycle in step 832, the mixing tank 202 is drained in step 848. If the mixing tank 202 fails to register as being drained, in step 810 the fail to drain flag is set and error message logged/transmitted.

Otherwise, in step 850 it is determined whether a further wash cycle is to be completed, and if so the process returns to step 814. For example, it may be desirable to perform a cold water flush, followed by a hot water wash.

If no further wash is required, in step 852 milk replacer is transferred from the holding tank 258 to the distribution tank 252, before the milk replacer apparatus 250 is returned to its mixing routine (for example method 700) in step 854.

Figure 9A:
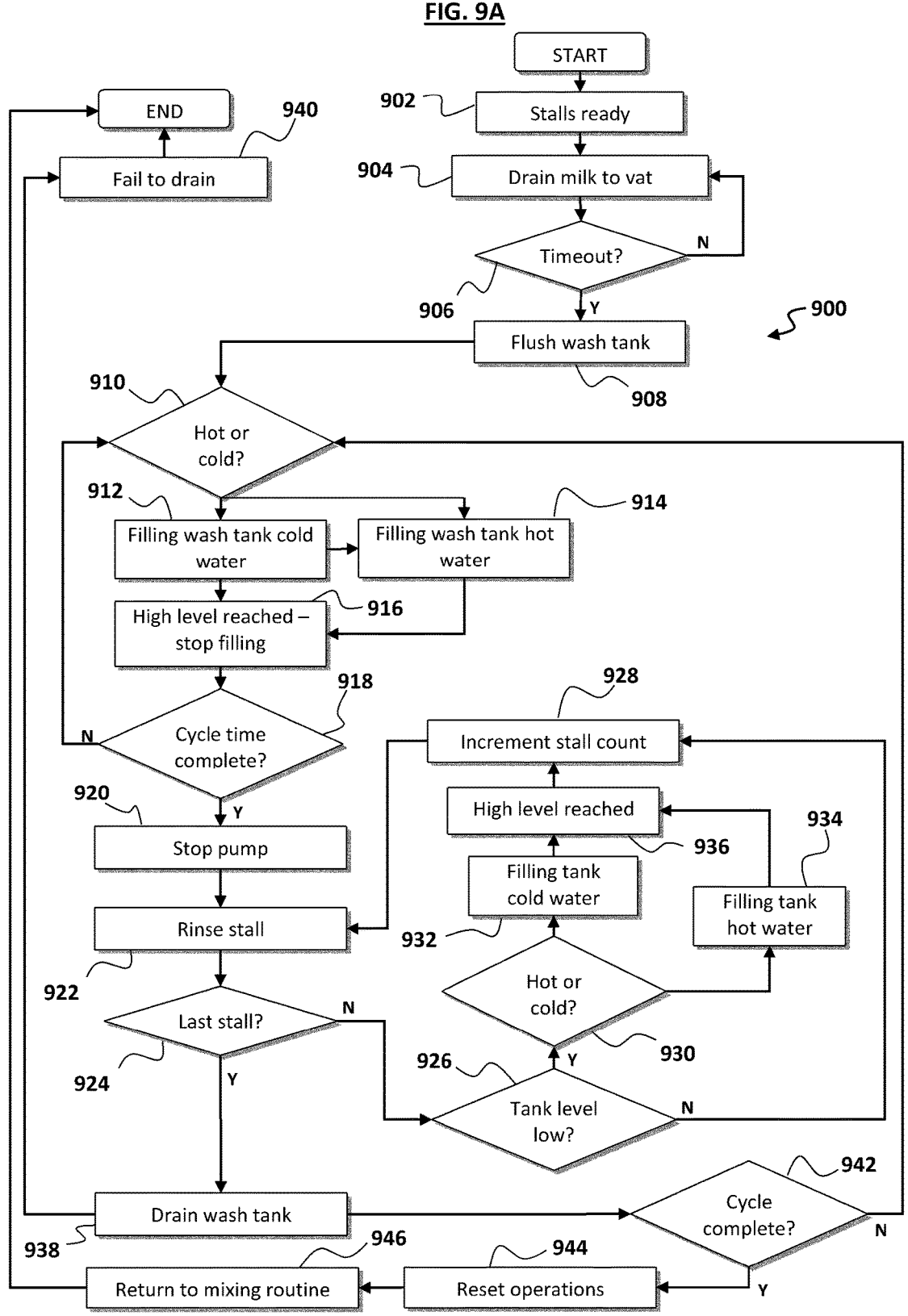
FIG. 9A is a flow diagram illustrating an exemplary method of washing an exemplary milk feed apparatus.

FIG. 9A illustrates a method 900 of washing milk apparatus 10. In step 902 it is determined that stalls (for example stall 300) is ready for a cold water wash cycle. In step 904 milk is drained from the common supply line 14 to the vat 12 by opening return valve 28 and operating pump 20. The pump 20 is run for a predetermined period of time to flush milk into the vat in step 906.

In step 908 a cold water flush of the system is performed by filling wash tank 36 with cold water and running the pump 20 to run water through common supply line 14 to the drain 32. On completion of the flush cycle 908, in step 910 it is determined whether a hot or cold wash cycle is to be performed. For example, a sequence of wash cycles—such as cold, hot, cold—may be performed.

In step 912 or step 914, the wash tank 36 is filled with cold or hot water respectively, with detergent being added in step 914. In step 916, when a high level of water is reached filling is stopped, and pump 20 operated until a low level is reached in the wash tank 36 is reached. In step 918, if it is determined that a predetermined period of time for the current cycle has not completed, the process returns to step 910. If the time has lapsed, the pump 20 is stopped in step 920.

In step 922 the stalls are rinsed, for example using method 600. In step 924 it is determined if all stalls have been washed based on a stall count bit set in software. If not, in step 926 it is determined if the wash tank 36 level is high—if so the stall count is incremented in step 928 and the process returns to step 922. If the wash tank 36 level is low, in step 930 it is determined whether a cold or hot wash is to be performed, and in steps 932 and 934 the wash tank 36 is filled with cold or hot water respectively, with detergent being added in step 934. Once the wash tank 36 level reaches a high level filling is stopped in step 936, and the stall count is incremented in step 928.

Once the last stall is determined as having been through the cycle in step 924, the wash tank 36 is drained in step 938. If the mixing tank 36 fails to register as being drained, in step 940 the fail to drain flag is set and error message logged/transmitted.

Otherwise, in step 942 it is determined whether a further wash cycle is to be completed, and if so the process returns to step 912. For example, it may be desirable to perform a cold water flush, followed by a hot water wash.

If no further wash is required, in step 944 a reset is performed and drain valve 30 closed and pump 20 turned off, before the milk replacer apparatus 250 is returned to its mixing routine (for example method 700) in step 946.

Figure 9B:
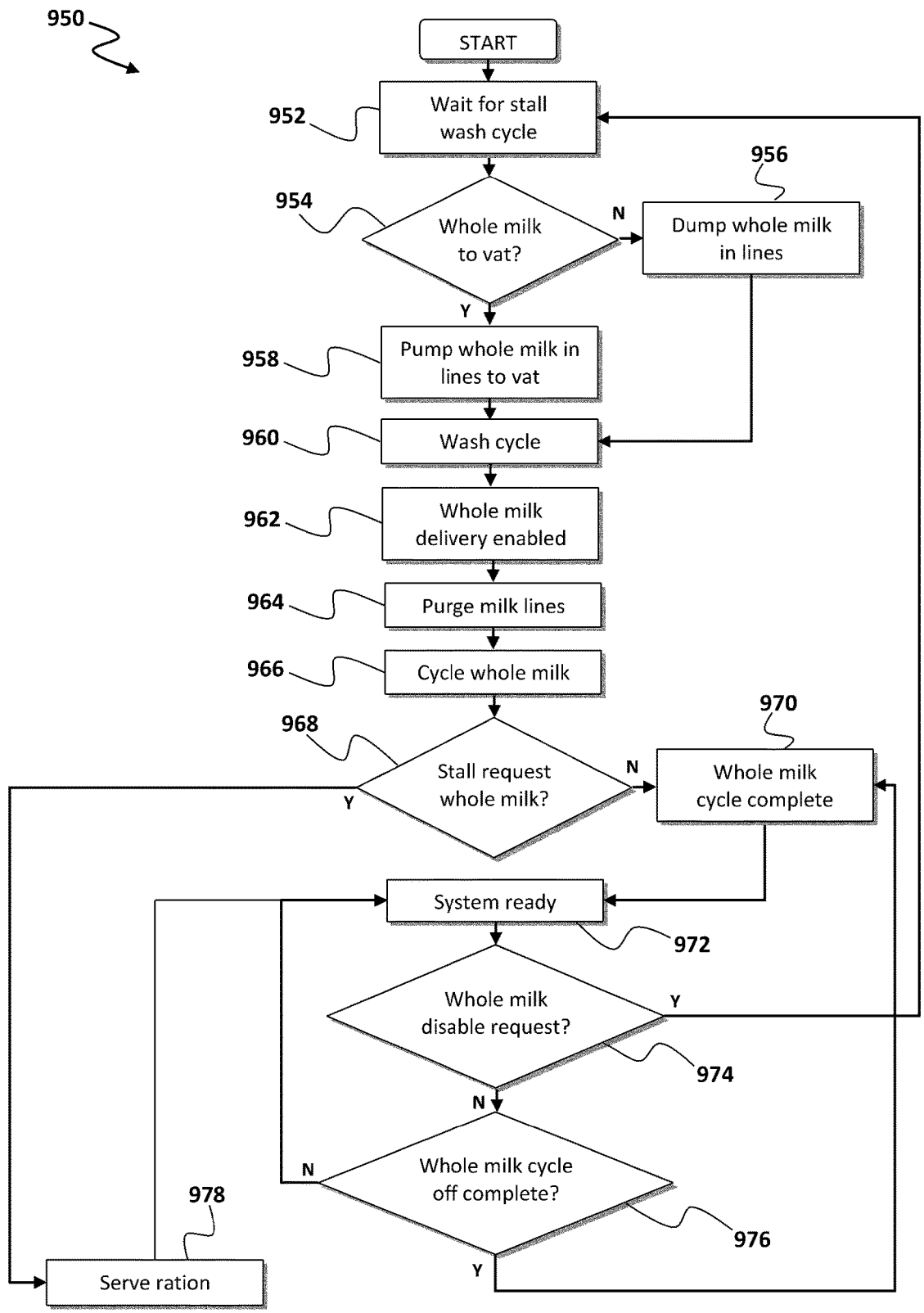
FIG. 9B is a flow diagram illustrating an exemplary method of operating an exemplary milk feed apparatus.

FIG. 9B illustrates a method 950 of controlling operation of milk apparatus 10. In step 952 the system waits for the stalls (for example stall 300 or stall 350) to go to a wash cycle. On determining that all stalls are in a wash cycle, in step 954 a determination is made as to whether the whole milk in the lines should be returned to the vat 12. If not, in step 956 the whole milk in the lines is dumped to the drain (for example drain 32). If so, the whole milk is pumped to the vat 12 in step 958.

In step 960 a wash cycle is carried out, which may include one or more of: a cold water rinse, a hot water rinse, an alkali wash, and/or an acid wash. Once the wash cycle is completed, the system waits to enable further operation of the milk apparatus 10 in step 962 (which may be manual or automated). On enabling the apparatus 10, the milk lines are purged in step 964, before whole milk is cycled through the lines in step 966.

The system awaits a request for whole milk from a stall in step 968. If no such request is made, in step 970 the whole milk cycled, before entering a system ready status in step 972. If a stall request is made, step 970 may be bypassed, and the requested ration delivered to the appropriate stall in step 978.

In step 974, if a whole milk disable request has been made, the system returns to step 952. If not, the system checks that the whole milk has been cycled within a predetermined time in step 976. If the time has lapsed, the system returns to step 970—if not, the system returns to the system ready status of step 972.

Figure 10A:
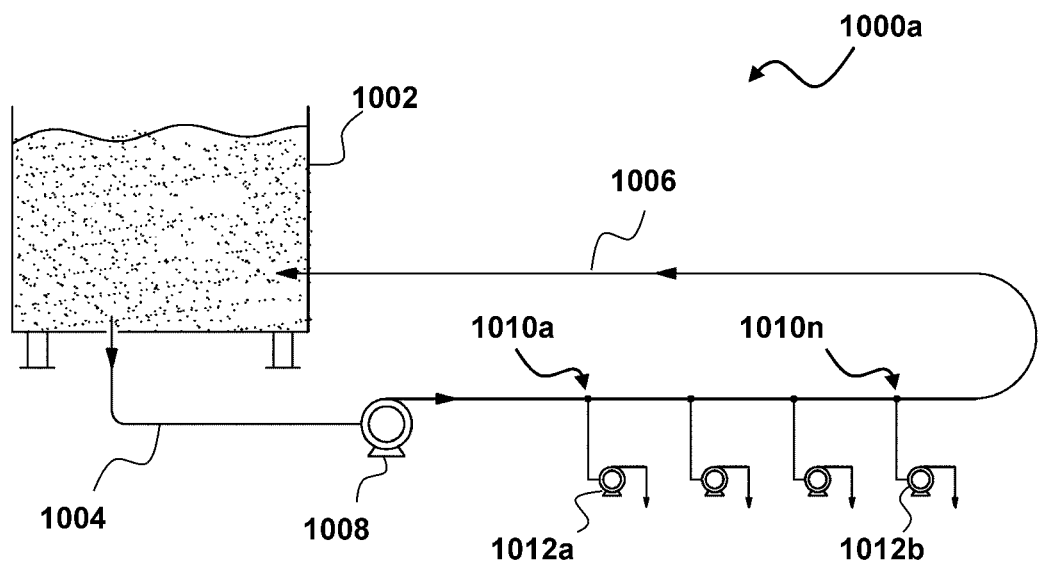
FIG. 10A is a schematic diagram illustrating an exemplary liquid feed delivery apparatus having a closed loop configuration and a first type of delivery mechanism to animal stalls.

FIG. 10A shows an exemplary general structure for a liquid feed apparatus 1000a, including a feed tank 1002 connected to a common supply line 1004 having a closed loop portion 1006 connecting back to feed tank 1002. Main pump 1008 is provided to deliver milk from the tank 1002, although it should be appreciated that gravity may be used to fill the common supply line 1004.

Branch lines 1010a-n connect the common supply line 1004 to animal feed stalls (not illustrated). Each feed stall includes a transfer pump 1012a-n for extracting feed from the supply line 1004. Volume may be controlled based on pump runtime, or level detection in a feed tank of the stall into which the liquid feed is delivered.

Figure 10B:
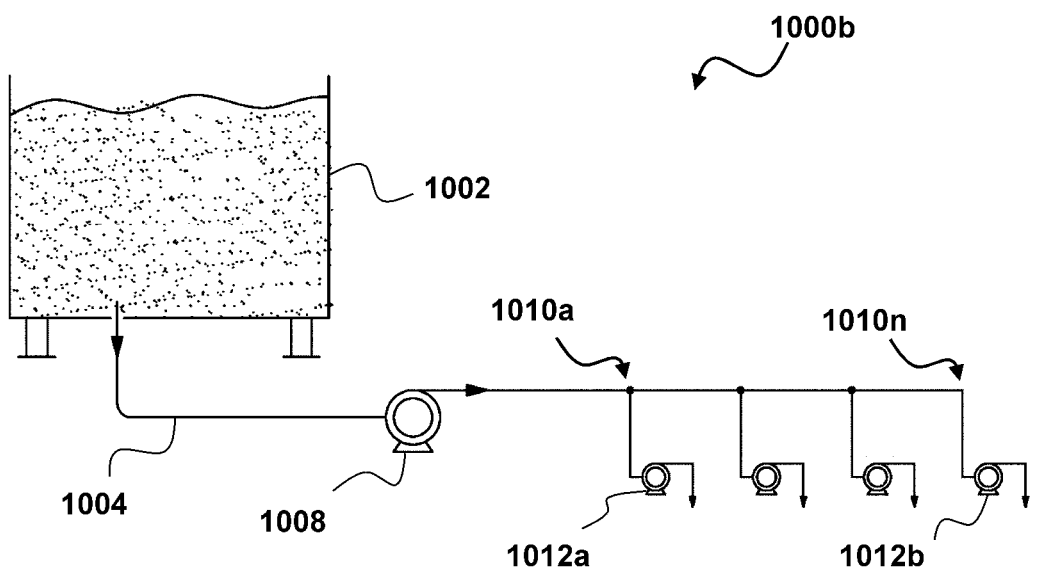
FIG. 10B is a schematic diagram illustrating the exemplary liquid feed delivery apparatus having an open loop configuration.

FIG. 10B shows an exemplary general structure for a liquid feed apparatus 1000b having a similar configuration to apparatus 1000a—but without loop portion 1006 connecting back to feed tank 1002.

Figure 11A:
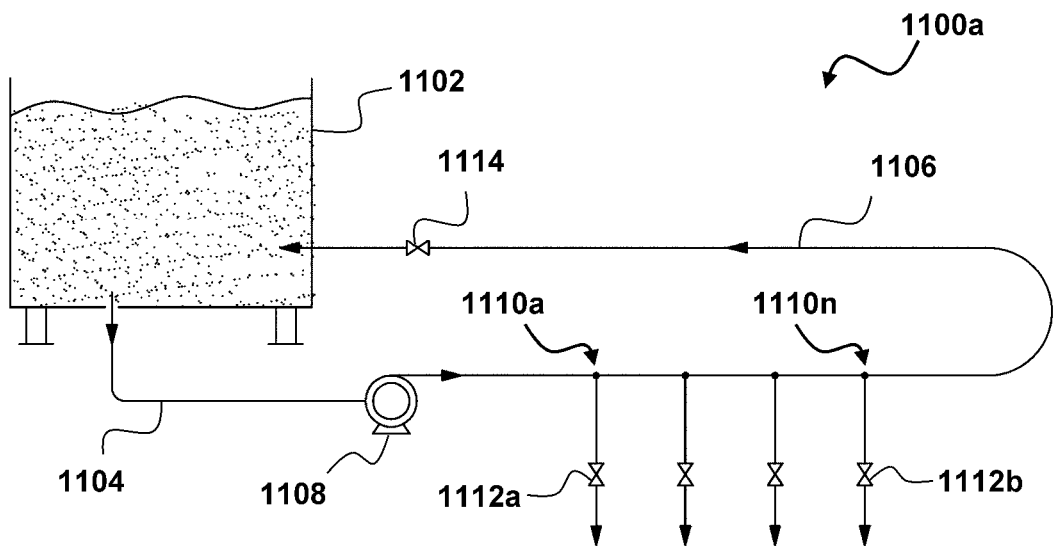
FIG. 11A is a schematic diagram illustrating an exemplary liquid feed delivery apparatus having a closed loop configuration and a second type of delivery mechanism to animal stalls.

FIG. 11A shows an exemplary general structure for a liquid feed apparatus 1100a, including a feed source tank 1102 connected to a common supply line 1104 having a closed loop portion 1106 connecting back to feed source tank 1102. Main pump 1108 is provided to deliver milk from the tank 1102, although it should be appreciated that gravity may be used to fill the common supply line 1104.

Branch lines 1110a-n connect the common supply line 1104 to animal feed stalls (not illustrated). Each feed stall includes a feed valve 1112a-n which may be opened to drain feed from the supply line 1104. Volume may be controlled based on pump 1108 runtime, feed valve 1112a-n open time, or level detection in a feed tank of the stall into which the liquid feed is delivered.

In order to prevent liquid feed from being directed back into the feed source tank 1102 via the closed loop portion 1106, as opposed to through open feed valve(s) 1112a-n, an isolation valve 1114 may be closed while the feed valve 1112a-n is open.

Figure 11B:
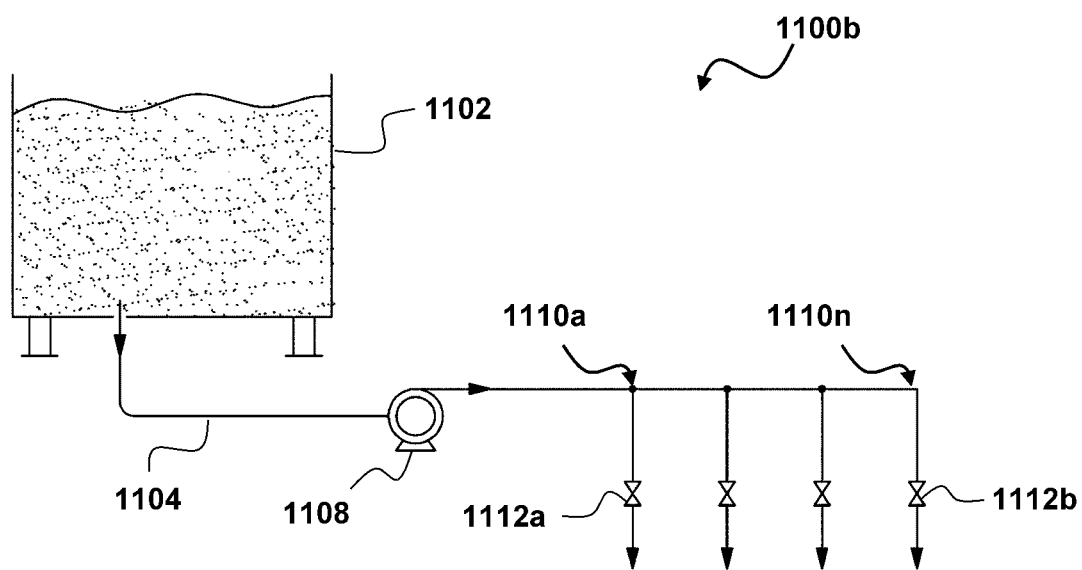
FIG. 11B is a schematic diagram illustrating the exemplary liquid feed delivery apparatus having an open loop configuration.

FIG. 11B shows an exemplary general structure for a liquid feed apparatus 1100b having a similar configuration to apparatus 1100a—but without loop portion 1106 connecting back to feed source tank 1102.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavor in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. A feed system for delivering liquid feed to animals comprising:
  a feed apparatus, comprising:
    a plurality of liquid feed sources, wherein one of the liquid feed sources comprises a milk vessel, and another of the liquid feed sources comprises a milk replacer system;
    a plurality of common supply lines, each connected to one of the liquid feed sources;
    wherein the milk replacer system comprises:
    a mixing vessel in which the milk replacer is mixed; and
    a distribution vessel which receives mixed milk replacer from the mixing vessel, and is connected to the common supply line associated with the milk replacer system, and
    a holding vessel into which milk replacer is controllably diverted from the common supply line associated with the milk replacer system; and
  a plurality of animal feeding stalls, each having a fluid connection to each of the common supply lines, wherein the fluid connections are spaced apart along the common supply lines.

2. A feed system as claimed in claim 1, comprising a controller configured to control delivery of liquid feed from each of the liquid feed sources to one of the animal feeding stalls to provide an individual feed ration.

3. A feed system as claimed in claim 2, wherein the controller is configured to deliver the individual feed ration in portions.

4. A feed system as claimed in claim 2, comprising an animal identification device, wherein the controller is configured to determine the individual feed ration for an animal identified while seeking to receive feed at the stall.

5. A feed system as claimed in claim 1, wherein each of the common supply lines is connected to a respective one of the liquid feed sources in a closed loop.

6. A feed system as claimed in claim 5, comprising a supply line isolation valve positioned between the last animal feed stall along the common supply line and the liquid feed source.

7. A method of delivering liquid feed to a plurality of animal feeding stalls comprising:
  controlling delivery of a first liquid feed and a second liquid feed via respective common supply lines to at least one of a plurality of animal feeding stalls, each of the animal feeding stalls having a fluid connection to each of the common supply lines, wherein the fluid connections are spaced apart along the common supply lines,
  wherein the first liquid feed is milk replacer, and the method comprises:
    mixing the milk replacer in a mixing vessel; and
    delivering the milk replacer to a distribution vessel from the mixing vessel, for delivery to the animal feeding stall via the common supply line configured to deliver the milk replacer; and
    diverting the milk replacer to a holding vessel during washing of the distribution vessel.

8. A method as claimed in claim 7, comprising controlling delivery of the first liquid feed and the second liquid feed to one of the animal feeding stalls to provide an individual feed ration.

9. A method as claimed in claim 8, comprising providing the individual feed ration in portions.

10. A method as claimed in claim 8, comprising identifying an animal seeking to receive feed at the stall, and determining the individual feed ration based on the identification.

11. A method as claimed in claim 7, comprising cycling unused liquid feed back to a liquid feed source from which the unused liquid feed was initially delivered.

12. A method as claimed in claim 7, comprising closing a supply line isolation valve positioned between the last animal feed stall along the common supply line and a liquid feed source before delivering the liquid feed to the animal feeding stall.

* * * * *